Dec. 12, 1967     S. C. LAWRENCE, JR     3,357,903
MONITORING SYSTEM AND METHOD FOR ELECTROPLATING
STEEL OR OTHER HYDROGEN-PERMEABLE METALS
Filed May 12, 1961                          2 Sheets-Sheet 2

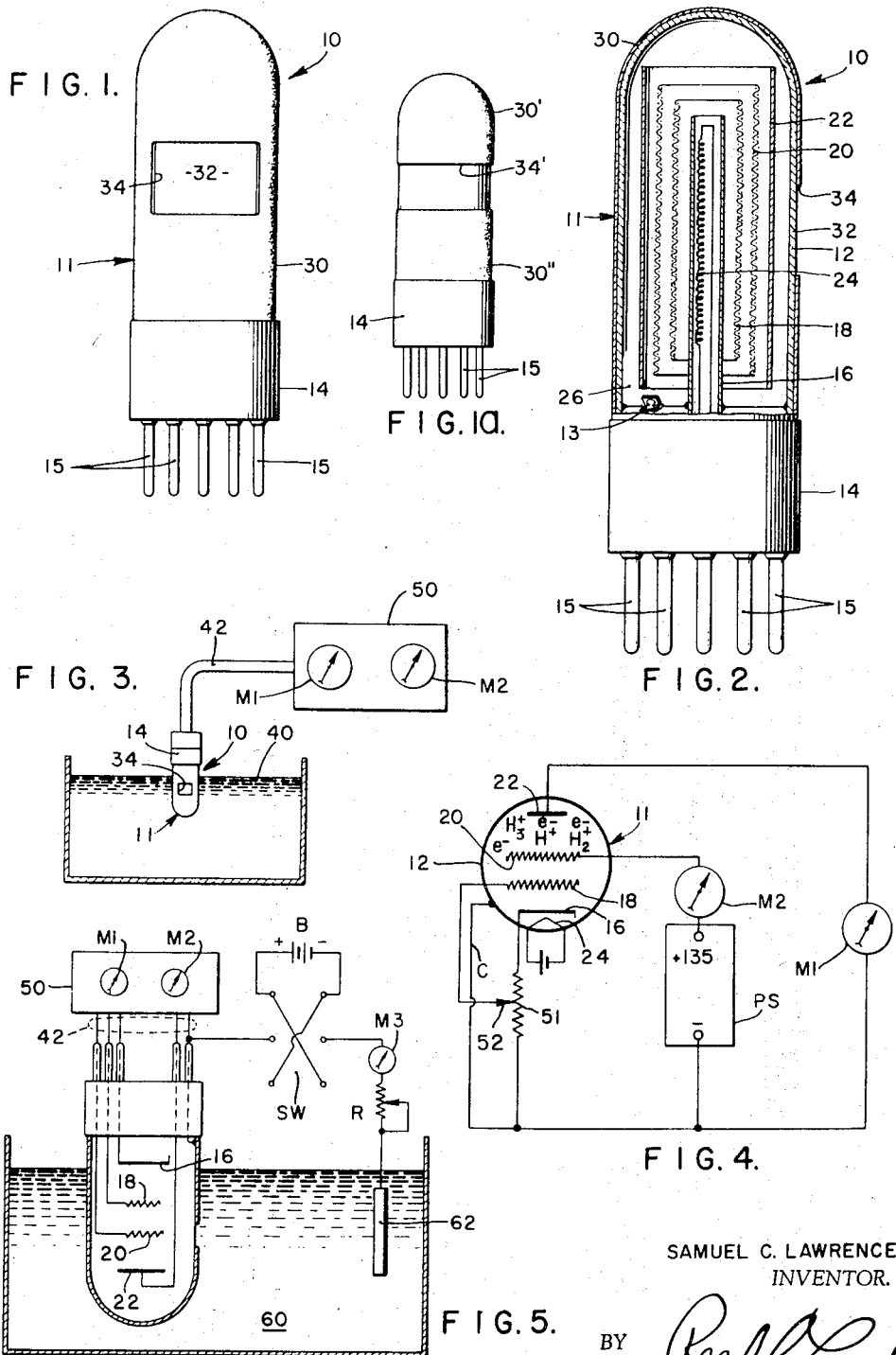

SAMUEL C. LAWRENCE, JR.
*INVENTOR.*

BY
ATTORNEY 3,357,903
MONITORING SYSTEM AND METHOD FOR ELECTROPLATING STEEL OR OTHER HYDROGEN-PERMEABLE METALS
Samuel C. Lawrence, Jr., 1814 S. 142nd Place, Seattle, Wash. 98168
Filed May 12, 1961, Ser. No. 109,716
9 Claims. (Cl. 204—45)

This application is a continuation-in-part of my prior applications Ser. No. 80,912, filed Jan. 5, 1961, now abandoned, and Ser. No. 94,202, filed Mar. 18, 1961, now Patent No. 3,257,841.

This invention relates to electroplating of metals, and to electronic apparatus and electronic methods for controlling hydrogen permeation of a metal being plated.

The general object of the invention is to provide a method and a means for controlling and regulating the permeation of a metal by hydrogen of a hydrogen-permeable metal undergoing electroplating, such as in connection with the cadmium plating of steel.

It is well known that many metals, especially steel, are embrittled by virtue of hydrogen contained in them. The phenomenon resulting in such embrittlement is called hydrogen embrittlement. Whether such gas is present in molecular form or atomic form or both is still undetermined. Though there may be some question as to the form in which the hydrogen exists in the metal, the hydrogen that is present there may be referred to as dissolved or absorbed hydrogen.

Hydrogen that causes embrittlement of metal may enter the metal in various ways. For example, hydrogen may enter a piece of metal while the surface of the metal is being cleaned with a paint solvent. Hydrogen responsible for embrittlement may also enter metal during the course of electroplating of the metal. Such embrittlement reduces the strength and hence the life of any object made from such steel.

The rate at which hydrogen can diffuse from a fluid into a metallic object can be measured to some degree of accuracy by submerging an electron discharge device, often referred to hereinafter simply as a tube, or vacuum tube, or electron discharge tube, or electronic tube, in the body of the fluid and then determining the effect that such immersion has on the electronic charatceristics of the tube. Phenomena of these types have previously been reported. See, for example, "Diffusion of Hydrogen from Water Through Steel" by Francis J. Norton, Journal of Applied Physics, vol. 11, pp. 262 ff., April 1940. See also U.S. Patent No. 2,526,038, issued to Herbert Nelson; U.S. Patent No. 2,790,324, issued to Maynard A. Babb; and U.S. Patent No. 2,921,210, issued to Edward Schaschl et al.

In such prior art devices, the electronic tube has been in the form of a diode, a triode, or a tetrode. Regardless of differences in structure between tubes, in accordance with the accepted theory of operation, the partial pressure of hydrogen within the envelope of the tube is increased while the tube is immersed in the fluid under investigation. This increase in pressure may be attributed to the migration of hydrogen ions through the wall of the tube shell to the interior surface thereof where the hydrogen ions combine with electrons in the tube wall to form hydrogen gas. The rate of diffusion depends not only on the diffusion and desorption characteristics of the wall but also upon the effusion properties of the fluid in which the tube is immersed. Since the effusion property depends upon the fact that the fluid is in contact with the wall of a metal object, it is sometimes referred to hereinafter as the hydrogen-effusion-into-metal characteristic of the fluid.

An electronic vacuum tube, such as above indicated and used for practicing the invention hereof, is sometimes referred to herein as a hydrogen probe or hydrogen detector. Also, in this specification the terms "effusion," "diffusion," "permeation," and "desorption" are employed to describe various phenomena that affect the flow of hydrogen from a body of liquid through the shell of a vacuum tube probe into the space within the shell. The effusion property refers to a property of the liquid. It represents the ability of the liquid to supply hydrogen to the external surface of a probe or to the external surface of a solid object that is immersed in a liquid. This ability may be due to electrical characteristics, chemical characteristics, or others. The term "diffusion" refers to the migration of hydrogen from one point to another within the material composing the shell of the probe or the object. The term "desorption" refers to the ability of a surface to cause hydrogen contained within the probe wall or within the object to emerge from the surface in gaseous form. The term "permeation" refers to the over-all ability of a wall member to permit the flow of the hydrogen through the wall from the space on one side thereof external to the wall to the space on the other side thereof internal to the wall. It is thus seen that, in the flow of hydrogen from the liquid under test into the space within the shell of the probe, the hydrogen effuses from the liquid to the external surface of the shell. There the hydrogen diffuses to the internal surface of the shell. At this point the hydrogen is desorbed thereby forming a gaseous atmosphere within the shell. The permeability of the shell depends upon the diffusion characteristics of the shell material and also the desorption characteristics of the internal surface, and also on the nature of the interaction between the external surface and the fluid undergoing investigation. The term "sorb" or "sorption" is used to include either absorption or adsorption or both.

In making tests with a series of such electron discharge tubes, it has been observed that the sensitivity varies widely from one tube to another. As a result, the measurements obtained heretofore have been very erratic.

I have discovered that a large portion of the variation in the characteristics of one tube from those of another can be greatly reduced by coating a part of the shell with a material that is impermeable to hydrogen, leaving a predetermined portion of the shell which is not so coated and which therefore forms a hydrogen-permeable window. In the practice of this invention, a series of electron discharge devices, such as 6V6 tubes, or even specially made tubes, that have homogenous shells, such as shells made of steel, are employed for this purpose. Even though the sensitivity of such tubes varies substantially from one tube to another prior to coating, it is found that the sensitivities can be equalized by forming hydrogen-permeable windows on their surfaces by coating the remainder of their sufaces externally with a coating material that forms a hydrogen barrier. In an alternative embodiment of the invention, the entire tube may be coated and the coating made thinner in the area that is to act as the window.

The forming of windows of predetermined area by coating such tubes not only has the advantage of making it possible to obtain comparative measurements with a series of tubes, but also improved the reliability of a single tube. For example, by partially coating a tube in the practice of this invention to form a window of predetermined area, reliable and reproducible measurements may be obtained with a single tube by immersing only the shell of the tube in a liquid under investigation while holding the base of the tube, and the seal between the base and the shell above the surface of the liquid. When the tube is so supported in the liquid, the hydrogen flows into the tube from the liquid through a predetermined area of the shell.

For best effects, vacuum tubes are employed which have been evacuated by conventional techniques under which the envelopes are sealed against the atmosphere and then gettering material is evaporated onto a portion of the interior wall of the shell in order to absorb residual gas that otherwise might be present within the envelope. Such gettering material not only removes residual gases remaining in the tube when it is initially manufactured, but also performs the additional function of removing the hydrogen that enters the tube in the practice of this invention. In this way the calibration of the tube is stabilized, thus increasing the utility of forming windows to establish the sensitivity at a predetermined value. Furthermore, when using a tube including such gettering material, hydrogen and other gases are easily removed without the necessity of resorting to the use of pumping systems.

I have found that most efficient operation can be obtained by coating the shells with hydrogen-impermeable material over the areas of the envelope opposite the deposits of gettering material that coat portions of the inside walls of such envelopes. In this way windows are formed opposite the portions of the envelope which are free of gettering material.

By forming such windows opposite the portions of the envelope that are relatively free of deposits of gettering material, a high degree of uniformity of sensitivity of tubes may be achieved, even though the windows are all of the same size. But in cases where differences in sensitivity still remain, compensation for such variations in sensitivity from one tube to another is made by removing a small amount of coating material or by adding a small amount of coating material, thus altering the areas of the windows. Alternatively, the thickness of the coating in the window area may be varied. In this way, the sensitivities of the tubes in a given set of tubes can be equalized. Such equalization of sensitivity is very important, since the tubes have limited lives and must be replaced at rather frequent intervals. By manufacturing tubes which have uniform sensitivity, more nearly comparative results may be obtained when a series of tubes are employed for measuring hydrogen diffusion from fluids under otherwise uniform conditions. Similarly, by use of tubes of equal sensitivities, differences in the hydrogen effusion properties of different fluids, or of the same fluid under different conditions, may be determined more reliably.

It is therefore a further object of the invention to employ electron discharge devices such as vacuum tubes of the character above-described for control units in monitoring electroplating systems and procedures of this improvement.

In repeating the same operations over and over, it is often desirable to use tubes having approximately equal sensitivities. However, under some circumstances it may not be necessary or desirable to employ tubes of substantially equal sensitivities. In such cases the sensitivity of each tube is measured beforehand and the sensitivity of each individual tube is taken into account in determining hydrogen effusion properties and in controlling the rate of hydroges effusion in liquids or baths, such as electroplating baths being employed, such readings, in turn, being read into the meter recordings developed by the present apparatus.

Another object is to monitor a plating operation by simultaneously plating the work and a vacuum tube and relying upon hydrogen permeation of the tube to control plating of the work.

A still further object of the invention is to employ apparatus of the indicated nature and the novel methods hereof in determining or controlling hydrogen permeation of metals according to this invention for use in controlling other operations than electroplating.

According to a further aspect of this particular improvement, an electronic vacuum tube having a metallic shell of the above-described character, whose sensitivity has been determined, is set into a plating bath (or other treating bath possessing hydrogen effusion characteristics) and both the tube and the work are subjected to the same treatment simultaneously.

In the case of a plating operation, the tube shell is electrically connected to a cathode bar alongside the article or piece of work to be plated, so that both this probe and the work are properly immersed in the plating bath and simultaneously subjected to the plating operation. In this manner, the work and the metal shell of the probe exposed to the plating solution or electrolyte are plated simultaneously, and the hydrogen permeations of both the shell and the work are proportional to the respective currents flowing to them. Taking into account the difference between the area of that portion of the tube shell being plated and the area of the work being plated, since the rate of hydrogen permeation of the tube shell and the amount of hydrogen permeating into the tube will be indicated by some means such as a recording meter hereinafter described and including a micro-microammeter measuring the ionization, the amount of hydrogen sorption by the work being plated is readily determined.

A further phase of the monitoring method according to this improvement involves control of various aspects including limitation of voltage, preparation of the surfaces to control porosity (as by sandblasting), limiting rinsing time to a maximum (such as five minutes) to reduce hydrogen permeation caused by rinsing, elimination from the steel surfaces of metals such as nickel which induce hydrogen permeation by the action of a galvanic cell between the nickel and the steel, limitation of hydrogen effusion in the electrolyte (as through the medium of buffers or inhibitors), and prompt baking of the plated steel work following rinsing whereby to drive off sorbed hydrogen, (noticeable surface roughness or porosity being essential as hereinafter developed for elimination of sorbed hydrogen by baking over a period of several hours).

A further object of the invention therefore is to control and reduce to minimum values the hydrogen permeation of steel objects and other metal objects which suffer embrittlement from hydrogen permeation during plating with hydrogen-effusing fluids by monitoring the plating through the medium of vacuum tube probes as the plating proceeds.

The invention possesses other features and advantages in addition to the foregoing, as will be apparent from reading the following specification and by reference to the accompanying drawings.

In the drawings:

FIG. 1 is an elevational view of a hydrogen probe used with this invention;

FIG. 1a is a similar view indicating a cylindrical window rather than a rectangular window seen in FIG. 1;

FIG. 2 is a longitudinal section through the probe of FIG. 1;

FIG. 3 is a diagrammatic view indicating one measuring use of the probe;

FIG. 4 is a schematic diagram indicating one form of circuit employable in making measurements of hydrogen effusion rates;

FIG. 5 is an elevational schematic view, partly in vertical section, indicating a use;

Figure 6:
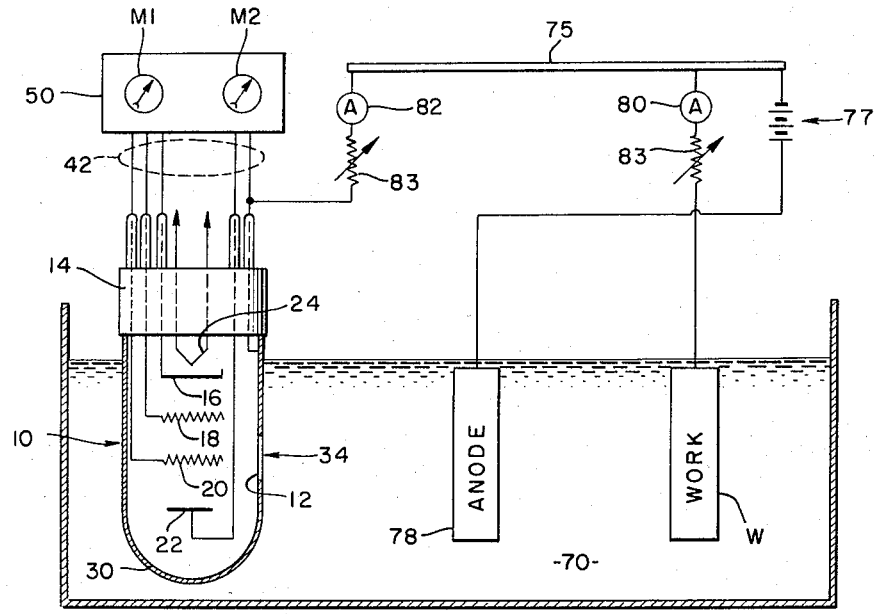
FIG. 6 is a view similar to that of FIG. 5 indicating a monitoring apparatus and method of this invention.

In FIGS. 1 and 2, there is shown a standard vacuum tube 10 known as a 6V6 tube which is employed in the practice of the present invention. This vacuum tube is provided with an envelope 11 which comprises a metal shell 12 sealed to an insulating base 14. The shell 12 is formed of a metal such as steel which is permeable to hydrogen. Such a tube comprises an indirectly heated cathode 16, inner and outer grids 18 and 20, and a plate 22. All of the electrodes are of cylindrical configuration and they are supported concentrically within the envelope 11. Each of the electrodes 16, 18, 20 and 22 and the shell 12 is connected electrically with an external metallic prong shaped terminal 15. The two terminals of the heater 24 mounted in contact with the cathode 16 are also electrically connected to the two external terminal prongs.

In the conventional method of manufacturing such a tube, the envelope 11 is evacuated by means of a vacuum pump and then sealed off against the ingress of air. At the time of sealing, the pressure within the envelope may be about $10^{-2}$ or $10^{-4}$ mm. Hg. In order to improve the operation of such a tube, the interior space is further evacuated by the evaporation of a charge 13 of gettering material within the envelope. Such a gettering material may, for example, consist of barium salts in combination with salts of aluminum or beryllium which when evaporated (flashed) produce free barium, or other material capable of absorbing residual gas remaining in the envelope after sealing. Upon evaporation, such gettering material forms a localized deposit on the interior wall of the tube, such as the deposit 26 shown at the lower end of the tube 10 in FIG. 2.

As is well known, such gettering material absorbs residual gases contained within the envelope of such a vacuum tube, thereby reducing the gas pressure to a much lower value, such as to a pressure of $10^{-7}$ mm. Hg. In some cases, the deposit of gettering material is at the upper end of the tube, instead of at the lower end, as shown. In other cases, the deposit of gettering material is on the side of the tube. In any event, during the course of manufacture of a series of tubes, the area covered by the deposit 26 of gettering material varies in a rather irregular manner from one tube to another. On the other hand, it is also possible to produce such high vacuums with special pumps or with getters that operate only when turned on—as with special auxiliary filaments. In such cases, gettering deposit masking on the tube surface is not necessary, but windows to control differences in gas permeation rates due to variations in shell structure or composition are required in order to give satisfactory results.

The outer wall of the shell 12 is coated with a hydrogen-impermeable layer 30 over a portion of the external surface thereof, but leaving a restricted portion 32 of the shell free of such coating material, thus forming a hydrogen-permeable, or hydrogen-pervious, window 34. The layer on the coated portion of the shell thus forms a barrier to the flow of hydrogen into the interior of the tube, while the uncoated portion forms a hydrogen-permeable window which permits the flow of hydrogen into the interior of the tube through the window 34.

In the best embodiment of the invention, the portion of the shell 12 opposite the deposit 26 of gettering material (when used) is coated with hydrogen-impermeable material, thereby locating the window 34 of an area of the shell which is free of gettering material, or at least has a small proportion of gettering material deposited thereon. In this way, the gettering material is available for absorbing hydrogen gas from the space within the tube. In this connection, it will be understood that the hydrogen-gaseous atmosphere developed within the interior of the envelope through the window 34 is gradually absorbed by the gettering material 26, until the gettering material has become saturated with hydrogen, or in other words, until the hydrogen absorption ability of the gettering material has been greatly reduced or exhausted.

It is not necessary for the window to have a rectangular shape as shown in FIG. 1. The window may have any other suitable shape and may, for example, be in the form of a cylindrical area 34' located between two areas 30' and 30" which have been coated with hydrogen impervious material as illustrated, for example, in FIG. 1a. In the latter case, for example, when using a 6V6 tube which has a shell diameter of 1 inch and a shell height of approximately 2 inches, the lower ¾ inch of the shell and the upper ½ inch of the shell are coated with hydrogen impervious material thus leaving a cylindrical strip of about ¾ inch height which acts as a cylindrical window having an area of about 2 square inches. In some cases, especially when there is no gettering material at the outer, or upper, end of the shell, coating material may be applied only to the portion of the shell that is adjacent the base.

There are a number of materials, such as natural or synthetic resins, which are impervious to hydrogen and which may be readily applied in the form of solutions by painting them onto the surface of the shell 12, or by dipping, or by spraying. In the case of dipping or spraying, the desired area for the window 34 may conveniently be masked, as by means of an adhesive masking tape useful for the purpose. For example, "chemical masking tape" may be used for this purpose during dipping. If such material is used, it is removed prior to use of the tube as a probe.

The well-known epoxy resins, in solution form or in other appropriate liquid form, are useful for the indicated purpose, as are other known synthetic resins in solution or other satisfactory liquid form, such as the well-known vinyl paints which need not be baked. Other coating materials are baking type black lacquer and so on.

An epoxy resin suitable for use in making a window with this invention is the epoxy resin known as Shell 1001. This resin has an epoxy equivalent of 500, that is, it has 500 epoxy groups per mole. To prepare such an epoxy resin for use as a coating material it is dissolved in a suitable solvent such as butyl alcohol, butyl "Cellosolve," xylene, or toluene, or compatible mixtures thereof. Pigments may be added in order to color the tubes. Prior to application of such coating material a suitable catalyst is added for accelerating the hardening of the coating when it is applied. A tertiary amine adduct made from Shell 1001 and containing free amine groups is a suitable catalyst. After coating the probe the resin is normally cured for 3 hours at 300° F. Likewise, when small quantities are applied to the edge of a window in order to alter the size of the window, it is cured by baking for 3 hours at 300° F. Such a coating is able to withstand temperature of 350° F. for 72 hours without discoloring, peeling or otherwise deteriorating.

From the standpoint of the inner layer 26 of gettering material, barium is a common and satisfactory gettering agent, as are many other known materials. Since the tubes to be used for this purpose, such as the well known 6V6 tubes, are commonly purchased on the market, they are used with such gettering materials as they may carry.

From the standpoint of the metal shell 12, any of the well-known hydrogen-permeable metals may be employed, such as platinum, palladium, and others well known because of their hydrogen-permeable characteristics. Palladium appears to be the most satisfactory metal for the indicated purpose, but others are usable such as iridium, ruthenium, osmium, and rhodium. For many purposes, however, it is satisfactory and more economical to employ commercially availabl 6V6 tubes which have shells that are made of steel. By employing such commercially available tubes and by forming hydrogen-permeable windows in them, a series of tubes having uniform hydrogen sensitivities may be readily produced economically, even though the permeability of the unwindowed shells to hydrogen may vary from tube to tube.

In FIGS. 3 and 4, there is shown schematically an arrangement for measuring the hydrogen effusion properties of a liquid. In this case, the end of the shell 12 of the probe 10 is located beneath the main level 40 of the liquid under investigation, while the insulating base 14 is located above that surface. An electric cable 42 into which the terminals 15 have been plugged connects the probe 10 with a measuring circuit 50. This circuit 50 includes a first meter $M_1$ for measuring a characteristic of the tube 10 that depends upon the amount of hydrogen that has flowed into the space within the envelope of the tube through the window 34, and a second meter $M_2$ that is used for standardizing the electron emission of the cathode.

By making measurements or the hydrogen effusion properties of different liquids, information is thus obtained for monitoring the operations of a system in which metallic objects are treated with such liquids. By use of such a tube, liquids which have the lowest hydrogen-effusion-into-metal characteristics may be selected. Any hydrogen embrittlement of metallic objects treated by liquids can thus be minimized.

A measuring circuit of the type that may be employed for measuring the pressure of the hydrogen atmosphere formed within the envelope 11 of the tube of this invention is shown in FIG. 4. As indicated there, the cathode 16 is connected to one end of a potentiometer 51, the other end of which is connected to the negative terminal of a power supply PS. The inner grid 18 is connected to the slide wire 52 of the potentiometer. The outer grid 20 is connected through a meter $M_2$ to the positive terminal of the power supply PS, and the plate 22 is connected through a micro-microammeter $M_1$ to the negative terminal of the power supply PS. The voltage supplied by the power supply PS is of such a magnitude that electrons accelerated from the cathode 16 toward the plate 22 attain energies corresponding to those above the ionization potential of molecular hydrogen. In use the shell 12 is connected to an electrode such as the cathode 16.

The outer screen or grid 20 is employed as an accelerator electrode. The plate 22 is employed as a positive charge collector, or positive ion collector. The inner grid 18 is employed for regulating the electron current formed within the tube under standard conditions. By manipulating the slider 52 on the potentiometer 51, the current flowing through the tube at any time may be standardized, thus compensating for differences in the electron emissive properties of cathode 16 of different tubes, or for compensating for differences in the electron emissive properties of the cathode of any tube during the life of the tube. The effectiveness of the inner grid for this purpose arises from the fact that the 6V6 tube has a gradual, or remote, cut-off characteristic as distinguished from a sharp cut-off characteristic thus permitting a gradual change of current to be produced when the bias on the inner grid 18 relative to the cathode 16 is changed. The bias on the emission control may also be adjusted when the probe is in use in order to adjust its sensitivity. Over a wide range of operation the ion current indicated by meter $M_1$ is proportional to the emission current indicated by meter $M_2$.

In operation, hydrogen effusing from the liquid diffuses through the window 34 of the tube 10 to the inner surface thereof. At the inner surface the hydrogen is desorbed thus increasing the pressure of hydrogen gas existing within the envelope 11. As mentioned above, the hydrogen may flow through the wall in the form of a positive ion current, combining somehow with electrons on the inner surface of the envelope, thereby forming atomic hydrogen. Such atoms of hydrogen then combined within the envelope, probably at the surface, to form molecular hydrogen which thereby establishes a molecular hydrogen atmosphere within the envelope. Regardless of the explanation of the phenomena involved, the fact is that the pressure of hydrogen gas within the envelope is increased when the tube is immersed in a liquid which is capable of causing such effusion of hydrogen into the envelope. By locating the window at a distance from the gettering material, direct absorption of hydrogen by gettering material as the hydrogen diffuses through the shell is avoided. Instead, the hydrogen is desorbed rapidly from the portion of the wall free of gettering material, thus maximizing the rate of flow of hydrogen into the space within the probe envelope.

In the process of accelerating electrons from the cathode 16 toward the accelerator grid 20, electrons travel at a high speed through the space between the cathode 16 and the accelerator grid 20. Thereafter, they are decelerated in the space between the accelerator grid 20 and the collector plate 22. Electrons bombard hydrogen in the space between the accelerator grid 20 and the plate 22 thereby ionizing the hydrogen gas. As a result, electrons represented by the symbol $e^-$ and hydrogen ions represented by the symbols $H^+$ and $H_2^+$ and $H_3^+$ are formed in the space within the envelope between the accelerator grid 20 and the collector plate 22. Such hydrogen ions, being positively charged, are repelled by the accelerator grid 20 toward the collector plate 22. When they strike the collector plate, they collect their missing electrons which therefore flow through the micro-microammeter $M_1$. At the same time, electrons formed in the ionization process are drawn toward the accelerator grid 20. These electrons flow to the positive terminal of the power supply. Hydrogen ions and electrons are also formed in the space between the two grids by virtue of the bombardment of hydrogen gas in this region by the accelerated electrons. These hydrogen ions flow to the inner grid 18, where they are discharged, and these electrons flow to the outer grid 20. The latter hydrogen ions and electrons do not contribute to the current flowing through the micro-microammeter $M_1$.

In practice, therefore, the magnitude of the current flowing through the meter $M_1$ is a measure of the pressure of hydrogen gas present within the envelope 11 at any time. In practice, it is observed that when a probe 10 exposed fluid is first turned on, the magnitude of the current flowing through the meter $M_1$ changes as a function of time. For this reason, measurements are made after the current has become stabilized, or else has fallen below some predetermined value. Then the probe is immersed in the fluid under test or in use and that rate at which the ion current increases is measured while the probe is exposed to the fluid.

In normal use, when a probe is first energized the ion current rises rapidly to a high peak value which may exceed $10^{-7}$ amp. This current arises from the fact that the initial heating of the probe, especially the initial heating of the cathode, causes some of the gases that have previously been adsorbed on various electrodes and the internal surface of the shell to be desorbed. While the probe remains warm these gases are adsorbed by the gettering material gradually reducing the ion current to a value of $4 \times 10^{-9}$ amp. or less. The time required for the ion current to reach such a sufficiently low value to permit subsequent significant measurements to be made, varies between 10 to 30 minutes, if the tube has once been previously properly prepared.

In connection with monitoring a plating-operation, for the purpose of controlling or determining coincident hydrogen permeation, or both, the tube probe 10 is lowered into the plating bath 70, indicated in FIG. 6, and is there mounted in conjunction with a cathode bar 75 to which the work W is connected. The cathode bar 75 is connected with a power source represented by a battery 77 which in turn is connected with an anode 78 in the plating bath 70.

In the line between the work W and the cathode bar 75 there is connected a meter 80 which measures the current supplied to the work W when being plated. In the line between the tube shell 12 and the cathode bar 75 there is disposed another meter 82 measuring the current supplied to the tube shell 12 when being plated. In these lines, there are also disposed variable resistors 83, such as rheostats, for equalizing the plating current densities to the work W and the probe 10.

The meters 80 and 82 act to show the currents supplied, the resistors 83 being adjusted to supply the same current density to the probe 10 as to the work W. Assuming constant hydrogen effusion, the amount of hydrogen sorbed by the work is readily established by taking into account the currents indicated by the meters 80 and 82 and the relative surface area of the work being plated and the window area being plated on the tube.

These aspects may be readily calculated from the readings of the micro-microammeter $M_1$ (which measures the hydrogen gas passing into the shell 12 at any time), the relative values of the stated surface areas being plated, and the relative readings of the meters 80 and 82. These meters may be conventional recording meters operating at a chart speed of about 10 mm. per second.

By these means, the rate of hydrogen effusion is followed and hydrogen sorption by the work determined. The character of the plating bath may thus be varied to a lower hydrogen effusion value if hydrogen effusion becomes so great as to imply excess hydrogen sorption possibilities; or, if deemed necessary, plating may be stopped. The possibility of preparing electronic discharge tubes to measure hydrogen permeation as described and to measure such permeation in connection with simultaneous plating of the tubes and the work makes it possible to plate by controlled procedures and with safety in cases where excess hydrogen permeation would be dangerous, or even fatal. Examples of such instances are the plating of carbon steel springs and the plating of railway axles. Failures have been known to occur even during actual plating operations. Since accurate knowledge of the amount of hydrogen sorbed by the parts allows close control of hydrogen input, as above indicated, excess hydrogen input can be avoided and hydrogen embrittlement prevented.

In preparing electronic discharge tubes for these purposes, the 6V6 or other tubes to be used are cleaned substantially in accordance with the following procedures in which Steps 1 to 3 refer to the initial preparation of the tube surface, Step 4 refers to the forming of a hydrogen-permeable window, and Steps 5 to 14 refer to the calibration of the probe.

*Step 1.*—Paint that may have been applied in the original manufacturing of the tube, nickel plating, if any, originally applied to the tube, and any oxide scale that has accumulated, are removed from the outer surface of the tube shell. This latter is best done by sandblasting, such as with 200 mesh grit or 100 mesh grit. The coarser grit produces a rougher surface, thus yielding a more porous plate.

*Step 2.*—Exterior nickel plating originally appearing on the surface of the shell is subjected to an electro-polishing operation with sulphuric acid-glycerol solution followed by distilled water rinsing, which is then followed by acetone rinsing or spraying. In these operations, the tube base 14 and the joint between the base and the metal shell 12, are supported above the level of the solutions.

*Step 3.*—If the electro-polishing operation of Step 2 is employed, the tube shell is again sandblasted in order to provide a roughened surface. This is important so that the subsequent cadmium plating will be porous as is often the case with plated steel objects. Such porous plating is important because the various treatments of the cadmium plated steel articles often cause hydrogen to be sorbed to a degree ordinarily sufficient to result in dangerous hydrogen embrittlement. To reduce danger from such embrittlement, hydrogen is subsequently removed by baking for a period varying from three hours to as much as 24 hours according to the steel treated. If a smooth electro-polished surface of such an article were plated, expulsion of sorbed hydrogen to an adequate degree would be impossible or uneconomical, since hydrogen does not diffuse readily through a dense, that is, imporous, cadmium plate. Therefore, the outer surface of articles to be plated are often sandblasted in order to facilitate economical hydrogen desorption of such articles by heating in order to reduce their hydrogen content. Accordingly, in order to produce a tube which has the hydrogen sorption properties of such steel object, the tube wall 12 is usually sandblasted to simulate the surface characteristics of the steel articles subsequently to be treated. The sandblasted tube is quickly washed in distilled water and preferably dried with acetone.

*Step 4.*—Using a chemical masking tape in combination with an epoxy paint for the end of the tube, a window is prepared thusly. The top ½ inch of the tube is masked and the lower ¾ inch of the top metal shell is masked, leaving a window ¾ inch high circumferentially around the tube.

*Step 5.*—The tube shell is connected to the measuring circuit 50 (FIG. 3) and the electron emission current adjusted to 5 milliamperes as measured with the meter $M_2$.

*Step 6.*—The tube shell is made anodic and the tube is immersed in a magnesium sulphate-sulphuric acid pickle bath 60, FIG. 5. The pickling current is set at 2 amperes. Anodic pickling is continued for 50 seconds. To make the shell anodic, the shell is connected to the plus terminal of a battery B and the negative terminal is connected through an ammeter $M_3$ to a cathode 62 submerged in the pickling bath 60 as illustrated in FIG. 5.

*Step 7.*—The tube is then removed from the pickling bath and is rapidly sprayed with warm water to remove traces of acid.

*Step 8.*—The tube is then dipped into hot (150° F.) water. Steps 7 and 8 should take 10 seconds total together. The tube ion current normally should read approximately $10 \times 10^{-9}$ amps. following Step 8.

*Step 9.*—The tube is then removed from the hot water and placed in a calibrating solution of sodium hydroxide at 70° F. The concentration of the sodium solution is 15 grams of sodium hydroxide per liter of solution. This solution has a predetermined hydrogen effusion rate.

*Step 10.*—When the ion current has decreased to $4 \times 10^{-9}$ amps., the tube shell is made cathodic with a current density of 0.8 amp. with respect to a graphite or gold anode. The time necessary for the ion current to again reach $10 \times 10^{-9}$ amps. is measured. Typical times are about 2 minutes and about 20 minutes respectively.

*Step 11.*—The tube is then removed from the bath and is again spray-rinsed with warm water, followed by an acetone spray.

*Step 12.*—If the hydrogen permeation rate observed, as measured by the time required for the ion current to change from $4 \times 10^{-9}$ amps. to be $10 \times 10^{-9}$ amps. in Step 10, is 10% too great, the window area is decreased by 10% and conversely, if it were too little, the window area is increased proportionately. The area of a window is adjusted by painting the edges of the window or by removing paint from the edges as previously described.

Steps 10 and 11 are then repeated if necessary. The measurement obtained in the last performance of Step 10 represents the calibration of the probe.

*Step 13.*—After the calibration has been satisfactorily achieved, the probe is rinsed in distilled water and is then sprayed with acetone in order to remove residual water. By removing residual water from the tube after it has been thus calibrated, the danger of rusting or corrosion of the tube prior to its subsequent use in measuring a fluid under test is greatly reduced.

In carrying out the foregoing steps, it is to be noted that certain of the steps, especially Step 6 and those associated therewith, are employed for cleaning the external surface of the tube shell. Other steps, especially Step 10 and those associated therewith, relate to the calibration of the tube. The best solution to employ for cleaning the external surface is a strong acid. However, the best solution to employ for calibration is a weak acid, a neutral solution or an alkaline solution. Posassium hydroxide may be employed in place of sodium hydroxide as a calibrating solution. Even water of known purity may be employed for calibration. In any event, however, strong acids are avoided during the calibration step because of the fact that they react rapidly with the outer surface of the tube. The anodic pickling cleaning process employed above is also known as an electrochemical cleaning process. By employing an anodic electrochemical cleaning process, permeation of the probe by hydrogen is avoided during cleaning.

It will be noted that the tube shell can be made either cathodic or anodic with respect to the graphite or gold polarizing electrode by manipulation of the reversing switch SW of FIG. 5. It will also be noted that the current flowing to or from the tube shell can be regulated by adjustment of the rheostat R which is connected between the switch SW and the polarizing electrode 62. It will be understood, of course, that this electrode acts as an anode when the tube shell acts as a cathode and acts as a cathode when the tube shell acts as an anode.

*Step 14.*—After the outer shell of the tube probe has been cleaned and calibrated as above, it is then prepared in the same manner as the work to be plated. For example, if the work is to be sandblasted prior to coating, as is often done, the window area of the tube probe is similarly sandblasted. The probe window area surface is thus similar in character to (or representative of) the surface of the work. Thereafter, the tube is connected to the measuring circuit 50 and allowed to warm up in air until the ion current, as read on a micro-microammeter $M_1$ becomes stabilized, i.e., until no more than a 5% change in ion current is observed in five minutes time. The electron-emission current within the tube will previously have been adjusted to five milliamperes.

The following steps refer to the plating operation:

*Step 15.*—When the monitored plating operation is to be undertaken, the tube window area and the work, prepared as above indicated, are connected to the cathode bar 75 (FIG. 6) and concurrently immersed in the plating solution 70, such as next to be described, at a predetermined temperature, such as 25° C., which temperature should be maintained approximately constant throughout the plating operation. The cadmium anode 78 is disposed in the plating bath 70 at a suitable distance with respect to the tube and the work, such as equidistant spacing. Plating voltage is applied and the resistors 83 are adjusted so that the plating current density is the same for both the tube probe 10 and the work W. Adjustment also may be made by varying the relative spacings of the tube 10, anode 78 and work W with respect to each other. In a typical case, the plating solution includes sodium cyanide approximating 146 lbs. per hundred gallons of water and 47 lbs. of cadmium oxide. The oxide is dissolved in a portion of the cyanide solution which is then added to the remaining cyanide solution which is placed in the plating tank employed. The first time the solution is made up the cadmium anode 78 remains in the solution from between about 8 to about 16 hours before use. The tube shell 12 then is made cathodic with respect to the cadmium anode and the plating current applied. According to the method presently deemed best, a current density of 40 amperes per square foot of work surface is used, and plating conducted for 7.6 minutes (minimum) or longer to yield the commonly desired thickness of 0.0005 inch of plating.

Since the window surface of the tubes employed has been set at a standard of 12.5 square centimeters, the current used is 0.54 ampere. For best results, the voltage applied is less than about one volt, and current operations employ 0.20 volt. This low voltage is used to maintain a low hydrogen effusion rate. A control or makeup solution is used that contains 6.5 to 8.0 oz. per gallon of cadmium in the form of 8.0 oz. per gallon (maximum) of sodium carbonates, 3.5 to 5.0 oz. per gallon of sodium hydroxide and 9 to 15 oz. per gallon of free sodium cyanide. As the plating solution ages, ingredients are added to maintain the composition within the ranges specified. If the sulfide content exceeds 1 part per million by weight, the solution is replaced.

*Step 16.*—The plated parts are removed from the plating bath, rinsed with distilled water, and dried.

Figure 7:
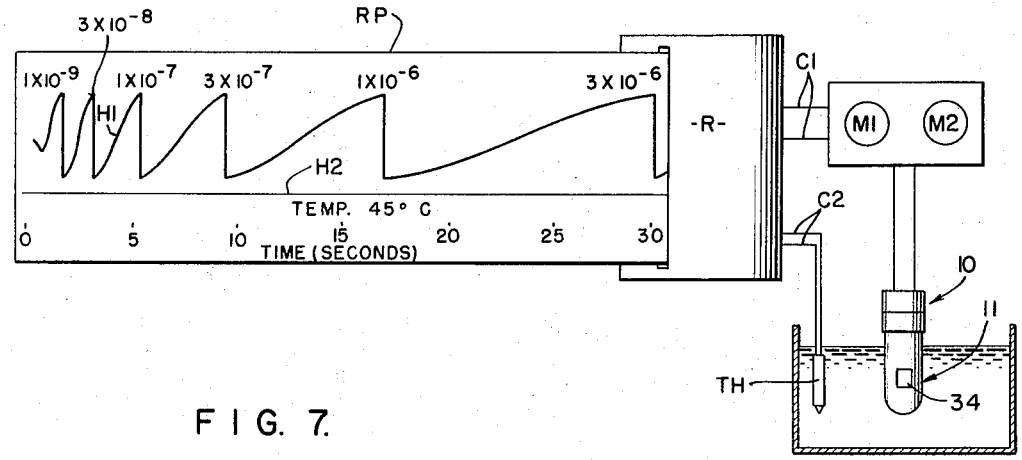
FIG. 7 is a diagrammatic showing of apparatus usable for recording hydrogen effusion rates encountered in monitoring a plating operation.

In FIG. 7, there is illustrated an arrangement for simultaneously recording the ion current and the temperature of an electroplating process. In this case the current flowing through the meter $M_1$ also flows through conductors $C_1$ to one input of a 2-trace recorder R. In addition, a thermocouple TH submerged in the bath is connected by means of a pair of conductors $C_2$ to another input of the recorder. A suitable recorder to employ is a type 542 Dynograph Recorder. In this particular case the micro-microammeter employs a sensitivity control that can be adjusted manually by manipulation of a multi-position switch, or knob. With the combination of the multiple sensitivity micro-microammeter $M_1$ and the recorder R, a graph $H_2$ is drawn automatically during a test showing how the temperature of the bath varies as a function of time. A graph $H_1$ is represented which shows how the hydrogen ion current in the probe 11 varies as a function of time. Time in minutes elapsed since commencement of recording is indicated at the lower edge of the recording paper RP. With this particular arrangement, the knob that controls the meter $M_1$ is manually switched to change its sensitivity whenever the recording pen reaches the upper edge of the recording paper RP. The figures written at the upper edges of the sawtooth wave graph $H_1$ indicate the sensitivity of the meter during the recording of the next previous portion of the graph. For example, in graph $H_1$ at a time 15 minutes after commencement of recording, the ion current was $0.8 \times 10^{-6}$. At the lower portion of the recording paper RP the temperature of the bath as detected by the thermocouple TH is displayed as a function of time.

This procedure is applicable to other metals than steel which are subject to strength loss by hydrogen sorption, including titanium, vanadium, columbium, zirconium, tantalum, molybdenum, nickel, palladium, tungsten, copper which contains oxygen, and various alloys of at least some of these metals.

Other procedures than electroplating steel with cadmium, which may be monitored by simultaneous treatment in accordance with this method, include: tin plating of "tin plate" for the production of "tin" cans for foods; stripping paint from metals with paint stripping solutions; detecting corrosion in pipe lines handling petroleum fractions or petrochemicals containing such corrosive agents as hydrogen-sulphur combinations (where the probe may be mounted in the pipe wall); electroplating copper wire; and hydrogen permeation in other environments such as treatments in molten salt baths, and "electrodeless" plating.

In all procedures herein indicated, the metal of the probe shell should be of the same material (where applicable) as that of the work undergoing treatment, and the surfaces should have been prepared in substantially the same manner (e.g. sandblasting, as above mentioned) so that the surface chemical reactions may be substantially identical. Where the parts under study have been plated, the probe and work should have been plated in the same fashion.

In addition to the above, a cadmium plated porous tube may also be employed to measure the concentration of a compound in an aqueous solution, at least where the compound is a salt that dissociates to make the solution conductive. In this case the galvanic action established between the iron shell and the porous cadmium plate generates local currents which cause hydrogen ions to permeate the shell in proportion to the conductivity of the solution. The hydrogen permeation rate is substantially proportional to the conductivity and hence substantially proportional to the concentration of the salt in the solution. Even an unplated porous tube may be employed for this purpose. In order to measure the conductivity of a solution with an unplated tube, a cadmium anode located at a distance from the tube is connected by means of a wire to the shell, thus causing a current to be generated which drives hydrogen into the tube.

The method of this invention may also be used to measure the porosity of a plate deposited on a metal object. To make such a measurement, the surface of a tube is first prepared in the same manner as the work and then the tube is plated in the same manner as the work. Tubes so prepared with different surface preparation and plating processes are immersed in a standard solution of ammonium hydroxide such as an 0.1 N solution and the hydrogen effusion rate measured for each tube. This measurement is most simply made by determining the time required for the current to rise from $4 \times 10^{-9}$ amp. to $10^{-7}$ amp. Measurements obtained in this way provide a comparison of the porosity of plates formed by different processes.

Since, as will be apparent, other variations than those herein indicated will occur to those skilled in the art, it is intended to include such as fall within the scope of the claims.

The invention claimed is:

1. In a monitoring method for treatment of objects in an electroplating solution,
   introducing into said electroplating solution an object subject to hydrogen permeation by said solution;
   introducing into said solution an electronic vacuum tube probe having a shell similarly subject to hydrogen permeation whereby the pressure of hydrogen within said shell increases as a function of time depending on the hydrogen effusion characteristics of said solution;
   supplying electric current to said object and said probe to effect electroplating of said shell and object simultaneously,
   separately measuring the currents supplied to said shell and said object,
   generating within said shell an electron current that ionizes the hydrogen gas therein thereby producing an ion current that varies with the pressure of the hydrogen within said shell,
   measuring at successive times the ion current developed in said tube probe during the period while hydrogen is permeating said shell and said object,
   and adjusting the hydrogen effusion characteristics of said solution in accordance with the rate of change of said ion current.

2. Electro-plating apparatus for measuring hydrogen permeation of work being plated, including:
   an electronic vacuum tube probe, said tube having a metal shell subject to being electro-plated in a plating bath;
   a hydrogen-effusing electro-plating bath receptacle;
   an anode;
   a cathode having means for attachment to said probe while said probe is in said bath, and electrical means for attachment to said work while said work is in said bath;
   circuit means to energize said tube, said work and said anode simultaneously while said tube is in said plating bath; and
   meter means for measuring hydrogen input to said probe.

3. Apparatus as in claim 2 including meter means for measuring electric current supplied to said work.

4. Apparatus as in claim 2 including resistor means connected with said tube probe and work for equalizing current densities to the work and the probe.

5. A method of monitoring the electroplating of an object subject to hydrogen permeation in a hydrogen-effusive plating bath, including:
   plating in said electroplating bath an object subject to hydrogen permeation therein;
   introducing into said plating bath a vacuum tube having a hydrogen-permeable metal wall like that of said object, said tube having electrode elements therein;
   plating said wall simultaneously with the plating of said object;
   energizing said electrode elements to cause ion current to flow to one of said electrodes in an amount depending on the pressure of hydrogen that has permeated through said wall;
   measuring the rate of change of said ion current while hydrogen is effusing from said bath through said steel wall into said vacuum tube to change the pressure of hydrogen gas therewithin;
   and controlling the plating of said object in accordance with said current flow.

6. In a method for monitoring the treatment of objects subject to hydrogen sorption in hydrogen-effusing media:
   introducing an object subject to hydrogen sorption into a hydrogen-effusing medium;
   introducing into said medium an electronic vacuum tube probe having a shell similarly subject to hydrogen sorption;
   supplying an electric current to said tube probe and to said object for plating the outer surfaces thereof;
   equalizing the plating current densities at the surfaces of said probe and said object;
   measuring the rate of change of electron current output of said tube probe;
   and adjusting the hydrogen-effusion characteristics of said solution in accordance with said rate of change of electron current output.

7. A method for measuring surface porosity of a plated metal work piece including:
   preparing a rough surface on the wall of a metal walled electronic vacuum tube having electrode elements therewithin;
   preparing a similar rough surface of a metal work piece;
   immersing said rough surfaces in a plating solution;
   simultaneously supplying electroplating current to said wall and said work piece whereby said surfaces are simultaneously plated; and
   measuring the plating currents flowing to the respective surfaces whereby the relative porosities of said surfaces may be ascertained.

8. In apparatus for measuring hydrogen permeation of work being plated:
   a hydrogen-effusing electroplating bath receptacle for receiving work to be plated;
   a hollow hydrogen detector probe having a metal shell subject to being electroplated in a plating bath;
   first cathode means for supporting a work piece in a plating bath in said receptacle;
   second cathode means for supporting said probe in said plating bath in said receptacle;
   circuit means for applying cathodic plating potentials to said work piece and to said metal shell simultaneously; and
   means for measuring the amount of hydrogen that has entered said probe during said plating process.

9. Apparatus as defined in claim 8, including means for measuring the electric current flowing to said work piece during plating; and means for measuring the electric current flowing to said probe during plating.

References Cited
UNITED STATES PATENTS

| | | | |
|---|---|---|---|
| 2,886,497 | 5/1959 | Butler | 204—1 |
| 2,921,210 | 1/1960 | Schaschl et al. | 324—33 |
| 2,927,888 | 3/1960 | Beard | 204—1 |
| 2,946,952 | 7/1960 | Marsh et al. | 324—71 |

OTHER REFERENCES

Norton, Francis, Jr.: Journal of Applied Physics, volume 11, No. 4, April 1940, pages 262–267.

Bloom, M. C., et al.: "Corrosion Studies in High Temperature Water by a Hydrogen Effusion Method," Corrosion, vol. 13, pages 27–32, May 1957.

JOHN H. MACK, *Primary Examiner.*

JOSEPH REBOLD, MURRAY TILLMAN, *Examiners.*

G. KAPLAN, *Assistant Examiner.*